Nov. 12, 1968    H. SCHIPPERS    3,410,938

METHOD AND APPARATUS FOR HOT MELT EXTRUSION

Filed Nov. 19, 1965

INVENTOR:
HEINZ SCHIPPERS
BY
Marzall, Johnston, Cook & Root
ATT'YS

United States Patent Office 3,410,938
Patented Nov. 12, 1968

3,410,938
METHOD AND APPARATUS FOR HOT MELT EXTRUSION
Heinz Schippers, Remscheid-Lennep, Germany, assignor to Barmer Maschinenfabrik Aktiengesellschaft Wuppertal-Oberbarmen, Germany
Filed Nov. 19, 1965, Ser. No. 520,812
Claims priority, application Germany, Nov. 26, 1964, B 79,497
9 Claims. (Cl. 264—102)

ABSTRACT OF THE DISCLOSURE

Method of processing a thermoplastic polymer in a hot metal extruder for removal of entrapped gas by introducing molten polymer through a vertical feed line where it is separated into a number of freely falling streams, a large throughput being facilitated by interposing an upwardly projecting convex surface to collect and distribute the streams of molten polymer into a thin layer, the polymer flowing downwardly over the convex surface into the inlet end of the screw extruder, while applying a vacuum to the separately flowing streams and to the convex surface for removal of the entrapped gas.

---

This invention relates to a method and apparatus for the processing of thermoplastic materials, especially synthetic thermoplastic polymers, in a hot melt screw extruder wherein the thermoplastic material is introduced at the feed or inlet end of the screw and conveyed under elevated temperatures and pressures to an outlet extrusion head at the other end of the screw. More particularly, the invention is concerned with a hot melt screw extruder and a particular method whereby the initial thermoplastic material is supplied in the molten state through a vertical feed line into the inlet or feed end of the screw.

For certain purposes, it is highly desirable to extrude relatively thin films, foils or filaments of synthetic thermoplastic polymers so as to achieve a very high quality product, particularly with respect to the formation of a very homogeneous, bubble-free product. The formation or entrapment of bubbles in the molten polymer during its extrusion can result in a non-homogeneous product having unsatisfactory properties of strength, transparency or utility as a dielectric material. These small bubbles in the polymer can be formed during extrusion by water, air or gas occlusions which can arise, for example, from the presence of residual monomers. In the spinning of fine or extremely fine filaments or fibers of polymers, these gaseous occlusions or entrapped bubbles cause considerable difficulties in the melt spinning process and subsequent treatment or textile processing of threads, yarns and the like. For example, these bubbles cause undesirable effects of form, color and light. The filaments or threads are frequently weakened to the point that an excessive breaking of individual filaments occurs.

In order to remove these troublesome gas bubbles entrapped or dispersed in the polymer melt, special screw extruders have been developed wherein the molten polymer as it is conveyed by the screw runs through an expansion section thereof during which it is exposed to a vacuum. In another known apparatus, the plasticized or molten polymer is conducted for the purpose of degassing from a first screw extruder into the middle section of a second screw extruder. In this case, the gaseous components are drawn off in a direction counter-current to the flow of the polymer in the second extruder, e.g. by applying suction at the end of the second screw extruder which lies opposite to the extrusion head. These known screw extruders are quite expensive and in addition, they generally do not provide satisfactory results.

It is therefore an object of this invention to provide a method and apparatus for the hot metal processing of a thermoplastic polymer wherein the initial polymer is introduced in molten form through a vertical feed line into the feed or inlet end of the screw extruder under conditions which permit an effective removal of entrapped gas bubbles.

Another object of the invention is to provide a relatively inexpensive method and apparatus for such removal of gas bubbles during the vertical feed of molten polymer into the hot melt screw extruder.

Still another object of the invention is to provide interchangeable means in the vertical feed line of the screw extruder for removal of such bubbles, whereby the apparatus and method of the invention can be readily adapted to a wide variety of thermoplastic polymers, e.g. polyolefines, polyesters, polyamides and the like which are especially suitable for production into films, foils, filaments or similar products, especially where the extruded product is to have a very thin or fine cross-section. Yet another object of the invention is to provide a method and apparatus which can be readily combined with a conventional hot melt screw extruder so as to effectively remove entrapped gas bubbles prior to the introduction of the molten polymer into the extruder, thereby preventing any interference with the operation of the screw extruder and also avoiding complex and expensive modifications of the screw extruder itself.

These objects are achieved, in accordance with the invention, by providing a hot melt screw extruder comprising a conventional screw contained within a barrel extruder for the conveyance and processing of a hot molten thermoplastic polymer from the inlet end thereof to an outlet extrusion head, vertical feed means to supply molten polymer to the screw, said feed means being connected to the inlet end of the screw extruder and including a vertical feed line in which there is arranged a transverse separating plate containing a plurality of openings at a spaced interval from each other sufficient to separate the molten feed into a corresponding plurality of separate streams between the plate and the inlet end of the screw extruder, and means to evacuate gas from the enclosed space in the vertical feed line below the separating plate. In essence, the method of the invention resides in separating the feed supply of the molten thermosplastic polymer into a plurality of separate streams in a vertical feed zone which is in fluid and gaseous connection with the inlet end of the screw conveyance zone of the hot melt extruder, and applying a vacuum or a reduced pressure to the separately flowing streams as they pass through the vertical feed zone for removal of entrapped gases from the polymer melt.

The following specification provides a detailed description of the invention, including several preferred embodiments of the newly proposed apparatus and method, taken in conjunction with the accompanying drawing wherein.

The same reference numerals are used to designate similar portions or elements in each of the different embodiments illustrated in the drawings.

Figure 1:
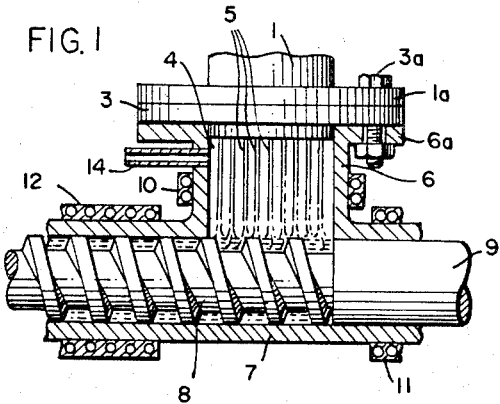
FIG. 1 is a partly schematic side elevation with a cross-section taken along the axis of the screw and the vertical feed line of the hot melt extruder according to one embodiment of the invention.
Figure 2:
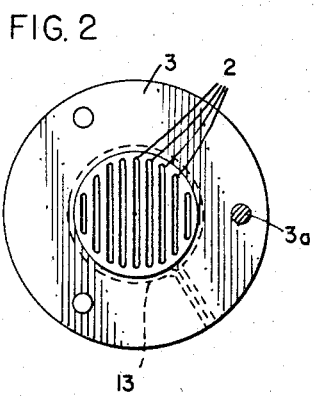
FIG. 2 is a top plan view of the separating plate as removed from the vertical feed line in FIG. 1.

Referring now to FIGS. 1 and 2, the initial supply of molten thermoplastic polymer is introduced through the upper portion or conduit 1 of the vertical feed line to pass through the slotted openings 2 of the separating plate 3. The molten polymer then flows vertically downwardly as discrete or separate streams 5 through the lower end 6 of the vertical feed line connecter to the inlet or feed opening of the extruder barrel or cylindrical housing 7 where the threaded screw 8 rotated by conventional drive means connected to the drive shaft 9 conveys the molten polymer forward (to the left) for extrusion through a conventional die or nozzle head (not shown). The separating plate is firmly secured or sandwiched between the opposing flanges 1a and 6a of the upper and lower side walls 1 and 6, respectively, of the vertical feed line by means of bolts 3a of which only one bolt is illustrated in FIGS. 1 and 2. The separating plate 3 can thus be easily removed and replaced by plates of various sizes and shapes of openings, depending upon the viscosity, temperature and other conditions affecting the fluidity of the thermoplastic material being processed.

The vertical feed line 6 as well as the extruded barrel 7 are wrapped by electrically heated bands 10, 11 and 12 for purposes of temperature control of the melt. Heat may also be supplied to these elements of the apparatus by suitable steam jackets or the like. It is also desirable to surround the perforated or slotted portion of the plate 3 with an electrically heated element 13 as indicated by the dotted lines in FIG. 2. This ensures a very careful control of the temperature of the melt as it is separated into a plurality of downwardly flowing streams. The upper portion of the vertical feed line 1 can also be surrounded by electrically heated bands, a steam jacket or any suitable heating means.

Below the separating plate 3, gas is evacuated from the vertical feed line chamber 4 through the conduit or gas outlet 14 attached to a vacuum pump (not shown). The considerably enlarged surface area of the separate ribbon-form or band-form streams 5 of the molten polymer in the vertical feed space 4 permits an effective degassing of the melt upon application of the vacuum to these streams, and the resulting bubble-free melt can then be processed in a conventional manner by the screw extruder.

Figure 3:
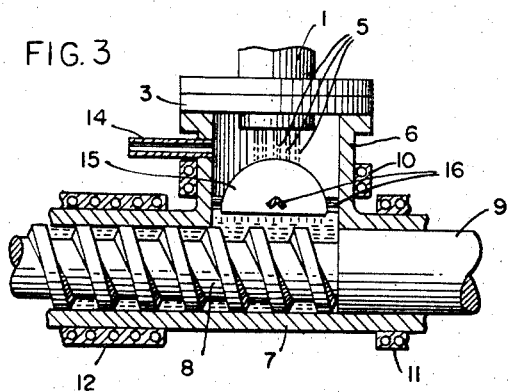
FIG. 3 is a partly schematic side elevation in cross-section similar to FIG. 1 but illustrating another embodiment of the invention.
Figure 4:
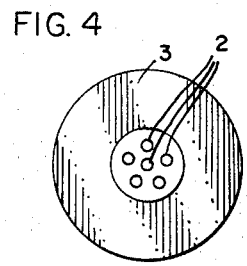
FIG. 4 is a top plan view of the separating plate as removed from the vertical feed line of FIG. 3.

With reference to FIGS. 3 and 4, a cup-shaped die or baffle member 15 is mounted on several supporting struts 16 so that its lower rim is spaced inwardly from the inner walls of the vertical feed line 6 and its convex top surface converges upwardly and inwardly toward the separating plate within the evacuated space 4 from which gases are likewise removed by line 14. In this embodiment of the invention, the initial molten polymer introduced through the upper vertical feed line 1 passes through a plurality of openings 2 in the separating plate 3 and falls downwardly in the chamber 4 in the form of a plurality of separate molten thread-like strands or bands 5 onto the upper portion of the hemispherically curved surface 15 and then flows downwardly and outwardly over this convex surface in the form of a thin layer or film and then into the feed or inlet opening at the end of the extrusion barrel 7. The threaded screw 8 again processes the thermoplastic material in a conventional manner by rotating through the drive shaft 9. This embodiment of the invention is especially desirable, because the molten polymer has a very large surface area exposed to the vacuum during passage of the melt both in the form of fluid strands and a thin layer through the chamber 4 prior to entry into the screw extruder. As shown in FIG. 4, the separating plate 3 is provided with a number of holes or bored openings 2 in a relatively small circular area near the center of the plate, and the total cross-sectional area of these holes is adapated to supply a sufficient amount of the molten polymer onto the convex upper surface of the cup-shaped member 15 such that the molten polymer is uniformly distributed in a thin layer over substantially the entire surface.

Figure 5:
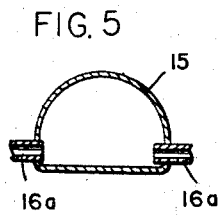
FIG. 5 is an enlarged side elevation in vertical cross-section through the cup-shaped member as removed with its tubular supports from the lower end of the vertical feed line of FIG. 3.
Figure 6:
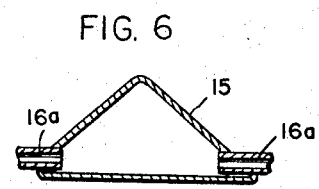
FIG. 6 is a enlarged side elevation in vertical cross-section similar to FIG. 5 but illustrating a conically shaped member with tubular supports.

In addition to the electricaly heated bands 10, 11 and 12 surrounding the vertical feed line and the extrusion barrel 7, it is particularly desirable to supply heat to the dome or cup-shaped member 15, for example by means of tubular supporting struts 16a as illustrated in FIGS. 5 and 6, these tubular struts being easily channeled through the wall 6 of the vertical feed line for circulation of a fluid heat transfer medium such as steam through the hollow dome or inverted cup-shaped member 15. The upper convex surface can assume various shapes such as the dome or hemispherical shape shown in FIG. 5 or the conically tapered shape shown in FIG. 6. It is also feasible to heat this convex surface 15 by means of an electrical heating element with the electrical lines being encased in the tubular supports 16a. Careful temperature control is also facilitated by incorporating an electrically heated element in the plate 3 as indicated in FIG. 2, this heating element, the bolts and bolt holes having been omitted from FIGS. 3 and 4 in order to simplify the drawing.

The use of such heating devices in the plate 3, the vertical feed line 6 and the convex surface 15 makes certain that the polymer melt is maintained precisely at that temperature which is most favorable to provide a freely flowing melt with a maximum degassing effect, in spite of the very large surface area of the melt as it passes through the degassing chamber 4. By combining all of these elements or measures as illustrated in FIG. 3, it is possible to obtain a final extruded product which is substantially completely free of bubbles.

Finally, in FIG. 7, still another embodiment of the invention is illustrated wherein the evacuated portion 17 of the vertical feed line is substantially enlarged both above and below the separating plate 3 in comparison to the initial feed supply 1 and the outlet feed line 18 connecting the bottom of the evacuated chamber 17 through a flanged joint 19 to the upwardly projecting feed inlet or supply line 20 of the screw extruder. The vacuum line 12 emerges directly below the separating plate 3, and by means of this enlargement of the open cross-section of the evacuated portion of the feed line, the effect of surface enlargement and degassing of the melt can be substantially increased. In this embodiment of the invention, it is also desirable to provide careful temperature control, for example by including a heating device such as an electrically heated band 21 around the enlarged chamber 17. Other than its enlarged cross-section, this chamber 17 and the plate 3 can be constructed substantially as shown in FIG. 1.

The apparatus and method according to the invention are adapted for use with all types of thermoplastic polymers and copolymers, and especially high quality extruded products can be obtained in the form of very fine filaments or thin films. Various fillers, plasticizers, dyes or pigments can also be incorporated in the melt for homogenization in the screw extruder, and these modifications as well as the operating conditions of the screw extruder itself are generally beyond the particular improvement of the present invention.

The present invention primarily resides in the construction and arrangement of the separating plate in the vertical feed line of the hot melt screw extruder, whereby a very high proportion of the total amount of initial molten feed is extended or dissipated in order to achieve a large surface area for contact with a reduced pressure or vacuum for thorough degassing of the molten polymer to a bubble-free form before it is processed and extruded by the screw. If the entrapped gas bubbles are not carefully and extensively withdrawn from the molten mass, the final extruded product exhibits many troublesome qualities as indicated above, and the method and apparatus of the invention are intended to provide a novel and improved solution for this problem.

In general, it was found according to this invention that the essential surface exposure of a high percentage of the total molten feed to the degassing effect of a vacuum can be readily accomplished by use of the separating plate alone in the vertical feed line and especially by the use of this separating plate in combination with an upwardly projecting convex surface located within the degassing chamber directly below the separating plate so as to receive the separate streams or jets of hot melt as a downwardly flowing thin layer over this convex surface.

In carrying out the method of the invention, the molten thermoplastic polymer is initially introduced into the upper portion of the vertical feed line so as to completely cover the inflow side of the separating plate, and the melt seeps or flows through the perforated or slotted openings of the plate so that entrapped gas bubbles can be removed and the gases evacuated as the melt falls in the form of separate ribbons, bands or thread-like jets through a relatively open cross-sectional space of the vertical feed line in gaseous and fluid connection with the inlet end of the screw extruder. When using the separating plate alone, relatively good degassing results have been achieved, especially if the separating plate is provided with holes or straight or curved slots running parallel to one another over substantially the entire cross-sectional area of the plate, i.e. in a cross-section perpendicular to the vertical flow of the melt. By enlarging this cross-sectional area of the separating plate and the evacuated space immediately below this plate, as indicated in FIG. 7, it is possible to maintain a relatively large and constant throughput of molten material since the remaining conduits of the vertical feed line are substantially filled with the molten polymer whereas the evacuated portion of the feed line contains a free or open space around the separately flowing strands. The best results have been achieved when using apparatus of the type illustrated in FIG. 3, in which case the openings in the separating plate should be positioned directly above the uppermost portion of the cup-shaped member so as to produce a uniform thin layer flowing downwardly over the convex surface through the annular space defined by the lower rim of the cup-shaped member and the inner wall of the vertical feed line. In this preferred embodiment of the invention, the cup-shaped member interrupts or intersects the vertically flowing separate streams of molten polymer and forms the thin layer of melt in such a manner that fresh bubble-containing melt is constantly brought to the surface and exposed to the vacuum.

In order to achieve an optimum degassing effect, it will be apparent that one must take into consideration the total cross-sectional area of all of the holes or slots arranged in the separating plate, the height of pressure head of the molten polymer in the vertical feed line above the separating plate, the spacing of the separating plate from the inlet opening of the extrusion cylinder and also the temperature conditions as they affect the viscosity of the particular polymer. Although some experimentation may be required in order to achieve the most effective removal of entrapped gas bubbles, the various heating devices applied to the apparatus of the invention permit a wide variation of temperature and therefore a very selective control of the melt viscosity. Furthermore, it is possible to insert a viewing plate in the vertical degassing chamber or to construct the entire chamber out of a heat-resistant transparent material so that the formation of separate streams or jets of the melt can be readily observed. Also, since the separating plate can be easily replaced, a number of different plates with various sizes and shapes of openings can be designed for use with different thermoplastic materials.

The exact arrangement and spacing of the holes or slots in the separating plate should generally be chosen such that the separated streams will not tend to rejoin or recombine during passage through the evacuated chamber. The distance between the separating plate and the inlet opening of the screw or other point at which the separated streams are recombined, should naturally be as long as possible in order to achieve a maximum degassing effect. However, attempts to force extremely high throughputs of molten material through the separation plate and the degassing zone have shown that it is not possible to simply enlarge the total cross-sectional area of the holes or slots within the cross-sectional area available in the plate itself. For example, if one chooses relatively large diameters for the holes or large widths for the slots, then there is only a moderate increase in the surface area of the melt exposed to the vacuum. On the other hand, if a very large number of holes or slots are provided, each with a relatively small diameter or width, then the distance at which they are spaced apart becomes so small that several fine streams or jets of the melt frequently unite into a single thicker stream or jet so that the desired increase in surface area within the degassing chamber is not achieved.

Figure 7:
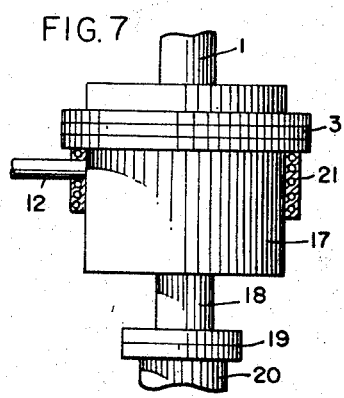
FIG. 7 is a side elevation of a vertical feed line illustrating still another embodiment of this feed line in accordance with the invention.

Accordingly, in order to provide the maximum number of separate streams of melt with the largest possible surface area exposed to the degassing effect, the enlarged degassing chamber as shown in FIG. 7 is often expedient since it provides the largest possible cross-sectional area of the separating plate and therefore the maximum number of holes or slots which can be used without causing individual streams to reunite within a short distance below the separation plate.

The cup-shaped guide or baffle member can also be interchangeably mounted within the degassing chamber so as to achieve various rates of flow of the molten material in a thin layer over the convex surface, for example by providing a more gradually sloping or tapering surface as the melt becomes more fluid and less viscous. Also, this cup-shaped member can be used in combination with a separating plate having a relatively fewer number of openings, i.e. the same surface exposure is achieved with a fewer number of separate molten streams, so that one need not enlarge the degassing chamber to such an extent that it becomes impractical.

Finally, the throughput and surface exposure of the melt can largely be controlled by supplying sufficient heat to prevent the melt from cooling and becoming too viscous for satisfactory operation. Again, the number and placement of heating devices depends to some extent upon the particular molten polymer being treated, but a very precise temperature control can be achieved by heating the vertical feed line and/or the separating plate and cup-shaped member inserted in this feed line. In other respects, the apparatus and method according to the invention are considerably more efficient and economical in producing a maximum degassing effect by comparison with previously suggested devices. The construction and arrangement of the vertical feed line can be readily adapted to existing screw extruders so as to obtain a final extruded product substantially free of entrapped gas bubbles and exhibiting an extremely high quality for many known uses.

The invention is hereby claimed as follows:

1. In a method for the hot melt processing of a thermoplastic polymer through a screw conveyance zone from the inlet end thereof to an extrusion outlet end wherein said polymer is supplied to said inlet end in molten form, the improvement comprising: separating the initial feed supply of the molten thermoplastic polymer into a plurality of separate streams in a vertical feed zone which is in fluid and gaseous connection with the inlet end of said screw conveyance zone, collecting said separate streams on an upwardly projecting convex surface such that the polymer melt flows downwardly in a thin layer over said surface and applying a vacuum to the separately flowing streams and said melt flowing over said convex surface in said vertical feed zone for removal of entrapped gases from the polymer melt.

2. A method as claimed in claim 1 wherein heat is supplied to said vertical feed zone in an amount sufficient to maintain the molten polymer at a predetermined temperature.

3. A method as claimed in claim 1 wherein heat is supplied to said polymer melt through said upwardly projecting convex surface.

4. A hot melt screw extruder comprising: a screw contained within a barrel extruder for conveyance of a hot molten thermoplastic polymer from an inlet end thereof to an outlet extrusion head; vertical feed means to supply molten polymer to said screw, said feed means being connected to the inlet end of said screw extruder and including a vertical feed line in which there is arranged a transverse separating plate containing a plurality of openings at a spaced interval from each other sufficient to separate the molten feed into a corresponding plurality of separate streams between asid plate and said inlet end of the screw extruder; means to evacuate gas from the enclosed space in said vertical feed line below said separating plate; and a cup-shaped collecting member mounted in the enclosed space below said separating plate, said collecting member having a lower rim spaced inwardly from the inner wall of said vertical feed line and a convex top surface converging upwardly and inwardly toward the separating plate to receive the separate streams of molten polymer and to distribute the polymer melt in a thin layer flowing downwardly over said convex surface, past said rim and into said inlet end of the screw extruder.

5. A hot melt screw extruder as claimed in claim 4 wherein said separating plate is interchangeably mounted in said vertical feed line.

6. A hot melt screw extruder as claimed in claim 4 wherein heating means are applied around said vertical feed line.

7. A hot melt screw extruder as claimed in claim 4 wherein heating means are applied to said separating plate.

8. A hot melt screw extruder as claimed in claim 4 wherein heating means are applied to at least one of said vertical feed line walls, said separating plate and said cup-shaped member.

9. A hot melt screw extruder as claimed in claim 4 wherein heating means are applied to said cup-shaped collecting member.

References Cited
UNITED STATES PATENTS

| | | | |
|---|---|---|---|
| 2,146,532 | 2/1939 | Crane et al. | 264—102 |
| 2,735,840 | 2/1956 | Lynch | 264—102 |

JULIUS FROME, *Primary Examiner.*

J. R. THURLOW, *Assistant Examiner.*